United States Patent [19]

Sowa

[11] 3,976,543

[45] Aug. 24, 1976

[54] TEMPERATURE ACTUATED SHUTDOWN ASSEMBLY FOR A NUCLEAR REACTOR

[75] Inventor: Edmund S. Sowa, Lisle, Ill.

[73] Assignee: The United States of America as represented by the United States Energy Research and Development Administration, Washington, D.C.

[22] Filed: Nov. 14, 1975

[21] Appl. No.: 631,969

[52] U.S. Cl. .............................. 176/86 R; 176/36 R; 176/DIG. 5
[51] Int. Cl.² .......................................... G21C 7/02
[58] Field of Search ............... 176/22, DIG. 5, 86 R, 176/36 R

[56] References Cited
UNITED STATES PATENTS

| | | | |
|---|---|---|---|
| 2,919,236 | 12/1959 | Zinn .............................. | 176/DIG. 5 |
| 2,935,456 | 5/1960 | Huston ............................. | 176/86 R |

FOREIGN PATENTS OR APPLICATIONS

| | | | |
|---|---|---|---|
| 235,874 | 3/1960 | Australia ......................... | 176/DIG. 5 |
| 1,277,379 | 10/1961 | France ........................... | 176/DIG. 5 |

*Primary Examiner*—Harvey E. Behrend
*Attorney, Agent, or Firm*—Dean E. Carlson; Arthur A. Churm; Joseph N. Hosteny

[57] ABSTRACT

Three identical bimetallic disks, each shaped as a spherical cap with its convex side composed of a layer of metal such as molybdenum and its concave side composed of a metal of a relatively higher coefficient of thermal expansion such as stainless steel, are retained within flanges attached to three sides of an inner hexagonal tube containing a neutron absorber to be inserted into a nuclear reactor core. Each disk holds a metal ball against its normally convex side so that the ball projects partially through a hole in the tube located concentrically with the center of each disk; at a predetermined temperature an imbalance of thermally induced stresses in at least one of the disks will cause its convex side to become concave and its concave side to become convex, thus pulling the ball from the hole in which it is located. The absorber has a conical bottom supported by the three balls and is small enough in relation to the internal dimensions of the tube to allow it to slip toward the removed ball or balls, thus clearing the unremoved balls or ball so that it will fall into the reactor core.

7 Claims, 5 Drawing Figures

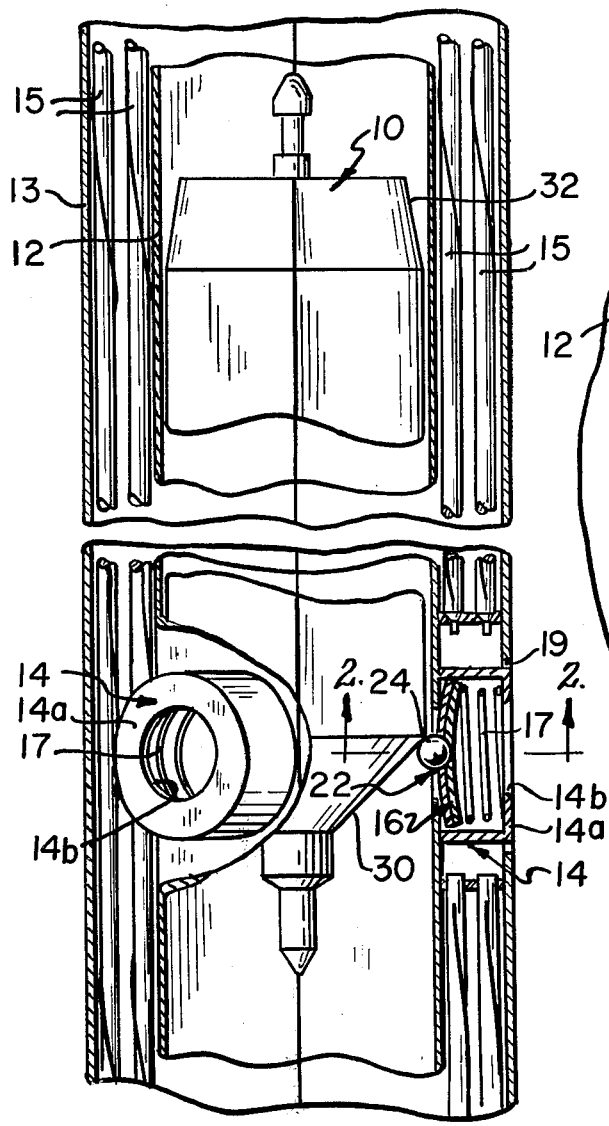
Fig-1
Fig-4
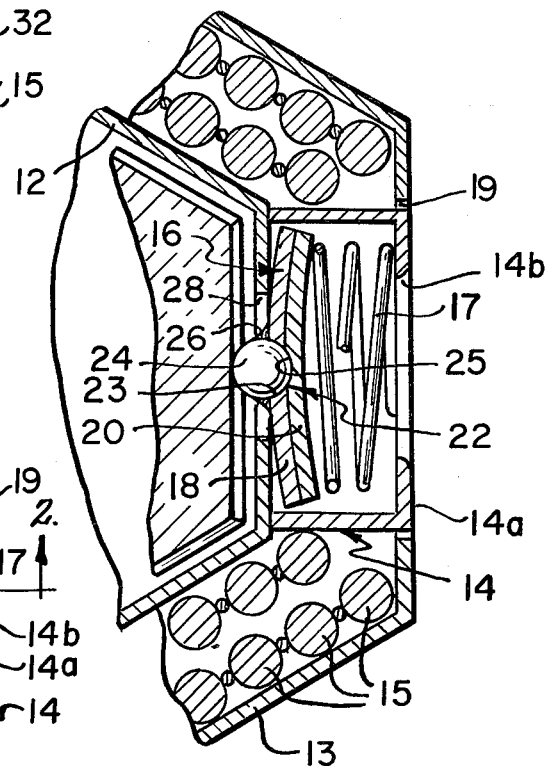
Fig-2
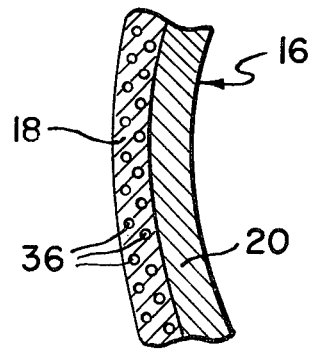
Fig-3

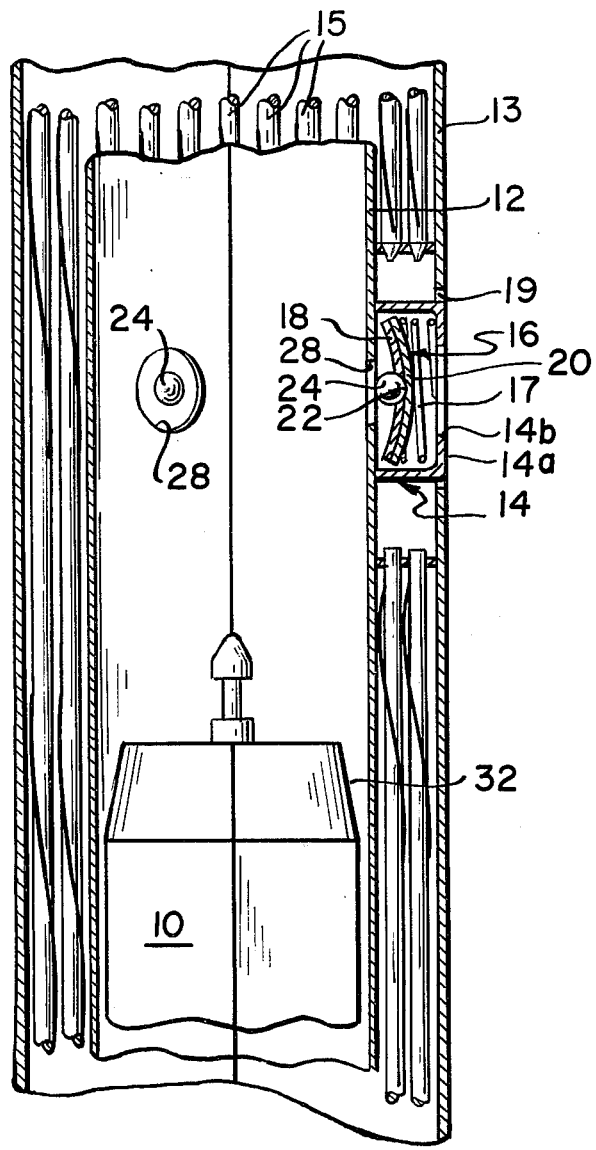

3,976,543

TEMPERATURE ACTUATED SHUTDOWN ASSEMBLY FOR A NUCLEAR REACTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a temperature actuated shutdown assembly which is useful for providing highly reliable and therefore inherently safe automatic actuation of liquid metal nuclear reactor core safety devices upon attainment of a preset temperature. More specifically, this invention provides automatic insertion of neutron absorbers into the core of a liquid metal nuclear reactor which is in danger of overheating due to excessive power for a given coolant flow.

Nuclear reactor cores are usually protected against excessive power by raising or lowering the number of neutrons available to cause fissions, the number of fissions per unit time being a direct measure of the energy released as heat in the core. The number of neutrons can be sharply reduced by insertion of a neutron absorber such as boron carbide. For rapid insertion into the core such absorbers usually rely on mechanical or magnetic latches which require signals, such as the cessation of electrical power, to release them. The assembly described herein is simple and therefore reliable, and purely mechanical in nature. Its mass is small and thus the assembly will respond rapidly to changes in temperature.

Changes in temperature of the assembly may be brought about by (a) an increase in the rate with respect to time at which energy flows into the assembly from another, hotter body, or (b) a decrease in the rate with respect to time at which energy flows out of the assembly to another, cooler body, or (c) an increase or decrease in the rate with respect to time of direct generation of energy as heat in the assembly by increasing or decreasing the number of fissions occurring in the assembly. In the first two modes, the driving force is the temperature difference between the assembly and its surroundings, while in the third mode, both the temperature difference and the rate at which fissions are taking place control the heating or cooling of the assembly. Any increase in the heat addition or generation rate without a corresponding increase in the heat removal rate leads to heating of the assembly and, if severe enough to constitute a danger or unsafe condition, eventual actuation of the assembly. Similarly, a decrease in the heat removal rate without a decrease in the heat addition or generation rate conduces to the same result. In a nuclear reactor, an increase in the rate of heat addition will be brought about by an increase in reactor power, i.e., the number of fissions per unit time. A decrease in the rate of heat removal will be brought about by a decrease in or complete loss of coolant flow. Increased heat generation in the assembly itself requires the presence of fissile material in the assembly which will respond to a higher fission rate in the rest of the reactor.

Relying upon heat generation within the assembly itself is especially useful because where coolant flow remains constant an increase in reactor power is a necessary prelude to overheating; therefore the assembly will actuate in response to the earliest indication of potential danger, since the increased fission rate in the assembly will cause the temperature of the assembly to rise due to heat generation as well as an increase in the heat addition rate due to the derivative effect of rising temperature in core components or coolant.

In the case of loss of or reduction in coolant flow, the assembly must depend on the decrease in heat removal rate. However, its small mass and intimate contact with coolant and core structure will still result in a rapid temperature response.

SUMMARY OF THE INVENTION

The invention employs a bimetallic disk, similar to a belleville spring washer, in the shape of a spherical cap composed of two metals with differing thermal coefficients of expansion. By making the outer or normally concave side of the disk of a material such as stainless steel and the inside or normally convex side of a material such as molybdenum which has a lower coefficient of thermal expansion than stainless steel, and by heating the disk, imbalanced thermally induced stresses will arise, which, at a temperature determined by the relative thicknesses and diameters of the two layers, will cause the disk's concave side to become convex and the convex side to become concave. This reversal of the two sides of the disk will hereinafter be referred to as switching. Several such disks are mounted on sides of a tube containing a neutron absorber. A spring is trapped between the bimetallic disk and a flange which is attached to the tube side, retaining the disk and spring; the spring urges the disk toward the tube.

A hole is located in the side of the tube concentrically with a spherical depression located in the inside center of each disk. A metal ball is retained on the inside of each disk by a lip formed out of the material of the inside layer; this ball projects partially through the hole in the tube. The absorber is slightly smaller than the inside of the tube and its bottom is conical so that the sole supports for the absorber in the direction of desired movement are the metal balls held against the conical section by the disks. Upon switching of at least one of the disks, the absorber will have sufficient clearance to insert into the reactor core depressing the reactor power to a safe level.

When the absorber is fully inserted, any disks which have switched are free to switch back to their former positions as soon as the temperature has dropped sufficiently below the actuating temperature. As the absorber is withdrawn to be reset for future use, a chamfered edge on the top of the absorber gradually pushes the disks back against their springs, allowing the absorber to be raised above the disks. Once the absorber is above the disks, the springs urge the disks against the tube, allowing the absorber to be rested on the balls projecting through the holes again.

BRIEF DESCRIPTION OF THE DRAWINGS

FIG. 1 is a partial vertical section showing interior portions in elevation of a temperature actuated shutdown assembly for a nuclear reactor.

FIG. 2 is a horizontal section taken on line 2 — 2 of FIG. 1.

FIG. 3 is a similar view to FIG. 1 showing the shutdown assembly after actuation.

FIG. 4 shows a partial cross section of the bimetallic disk showing an alternative embodiment and FIG. 5 shows a partial cross section of the bimetallic disk showing another alternative embodiment.

SPECIFIC EMBODIMENT OF THE INVENTION

The assembly is a preset temperature actuated bistable device for automatically removing the restraint on a neutron absorber allowing the absorber to insert into the core of a liquid sodium cooled fast breeder nuclear reactor thus preventing core overheating due to excessive power for a given coolant flow.

Referring to FIG. 1, a neutron absorber 10, hexagonal in cross section, is surrounded by a slightly larger doublewall hexagonal tube having an inner tube 12 and an outer tube 13. The annulus therebetween is filled with two rows of fuel pins 15 some of which are interrupted to allow space for circular "L" shaped flanges 14 made of stainless steel and welded to three sides of the inner tube 12 at the same elevation on the tube. The outer tube 13 has holes 19 therein within which circular flanges 14 fit tightly; a lip 14a on each flange forms a smooth continuous surface with the surrounding outer tube 13. This minimizes interference with the sodium coolant flow around the outer tube 13 and allows the tubes 12 and 13 to be placed adjacent to other hexagonal tubes, not shown, in the reactor core which contain similar absorbers, control rods, or fuel rods. Each circular flange 14 contains a bimetallic disk 16 and a nickel-chromium-iron alloy helical spring 17 trapped compressively between the flange and the disk. The lip 14a is only wide enough to support the spring 17; a hole 14b defined by the lip 14a insures intimate contact between the sodium coolant and the disk 16 so that heat transfer will be improved. The hole 14b also facilitates inspection of the disk 16 and spring 17. Each bimetallic disk 16 is shaped as a spherical cap and is made of a layer 18 of molybdenum on the inside or normally convex side of the disk and a layer 20 of stainless steel on the outside or normally concave side of the disk. This relationship of concave and convex sides will hereinafter be described as the closed position of the disk 16. These materials are chosen for the difference in their thermal coefficients of expansion which gives the switching action as well as for their compatibility with high temperature liquid sodium coolant and a low tendency to interdiffuse at high temperatures; other suitable material combinations, such as a nickel-chromium-alloy on the outside with molybdenum or a molybdenum-titanium alloy on the inside are also suitable.

As shown in FIG. 2, the inside or normally convex side of the disk 16 has a spherical depression 22 formed in it; its radius is slightly larger than the radius of a metal ball 24 made of cobalt alloy tool material whereby a smooth sliding fit is obtained between the depression 22 and the ball 24. The ball 24 is rotatably retained in the depression 22 by a retainer 26 formed as part of the material of the inside layer 18. The cross section of the retainer 26 is substantially right triangular where one right triangular leg is integral with the inside layer 18 and the other right triangular leg is curved slightly to match the radius of the depression 22 whereby the ball 24 is rotatably retained. In the embodiment shown, the depression 22 is large enough so that it penetrates completely through the inside layer 18 of the disk 16, thus defining a hole 23 in the inside layer 18 with the shape of a zone of a sphere, and a spherical depression 25 in the outside layer 20. However, this is not critical; depending upon the size of the ball 24 in relation to the disk 16, the spherical depression 22 may or may not penetrate through the inside layer 18 and into the outside layer 20. The ball 24 is thus trapped in the disk 16 and faces a port 28 in the side of the inner tube 12 which is located concentrically with a line normal to the plane of the side and passing through the center of the ball 24. The disk 16 is urged toward the inner tube 12 by the spring 17. The ball 24 is large enough to project partially through the port 28 in the closed position to the inside of the hexagonal tube 12 as shown in FIG. 1. The absorber 10 is supported solely by means of the conical bottom 30 thereof resting upon the metal ball or balls 24.

As shown in FIG. 4, a thin layer or foil of fissionable metal 34 may be disposed in the bimetallic disk 16. Fissions at a rate proportional to reactor power will then take place in the disk 16, thus generating heat within the disk itself to raise the temperature of the disk in addition to relying on heat addition from core components or coolant. If desired, the fissionable material may be in the form of a metal oxide 36, dispersed as nodules in at least one of the layers 18 and 20 of the disk 16 as depicted in FIG. 5. The addition of fissionable material in either form is not necessary to the invention, but can be used to decrease the response time of the disk 16 in the event of a dangerous power increase. The exact distribution and quantity of material used depend on other core parameters, such as type of coolant, location of the assemblies in the core, neutron spatial and energy distributions, reactor power, etc.

Referring to FIG. 3, upon reaching a preset temperature in the range of about 550°C. to 770°C. (the exact temperature being determined by the difference in thermal expansion coefficients and diameters and thicknesses of the two metals in the bimetallic disk 16), the difference in thermal expansion coefficients gives rise to imbalanced thermal stresses, which cause at least one disk 16 to switch so that the inside layer 18 is now concave and the outside layer 20 is now convex. Thus concave and convex sides will now be reversed. This position of the disk 16 will be referred to hereinafter as the open position. The disk 16 does not bend or retract gradually from the closed to the open position or vice versa. The generally spherical shape of the disk 16 gives it a bistable characteristic, that is, it has two stable states; all other states are unstable. When the preset temperature is attained by heating the disk 16, the disk will, if in the closed position, snap abruptly to the open position. Conversely, if the preset temperature is attained by cooling the disk 16, the disk will, if in the open position, snap abruptly to the closed position. For this reason, bimetallic disks are used, for instance, as contacts in electrical switches.

The lateral displacement is sufficient to pull the ball 24 from the inside of the inner tube 12. The conical bottom 30 of the absorber 10 also exerts a force which tends to push the ball 24 out of the tube 12. The absorber 10 is sufficiently smaller than the tube 12 so that removal of any one ball 24 will allow the absorber 10 to slip off the remaining two balls 24 and be inserted into the nuclear reactor core.

When the absorber 10 has been fully inserted into the core, it will be below the disks 16 as shown by FIG. 3. When the actual temperature is again below the preset temperature, any open disk 16 will switch to the closed position due to the imbalanced thermal stresses, which tend to produce an opposite effect when the actual temperature falls below the preset temperature. Hence, the spring 17 is required so that when the absorber 10 is lifted into position for another use, as shown in FIG. 1, a top chamfered edge 32 on the top of the absorber 10 will gradually push the disks 16 back against the springs 17 until the absorber 10 has been lifted above the disks, when the spring will push the closed disks 16 back into position so that the absorber 10 may be rested on the balls 24.

The embodiment of the invention in which an exclusive property or privilege is claimed is as follows:

1. A temperature actuated shutdown assembly for a nuclear reactor comprising a neutron absorber, a tube disposed around said absorber and coaxial with the longitudinal axis of the absorber, said tube having a plurality of ports therein spaced around its circumference, a flange welded to the tube concentrically over each port, a bimetallic disk retained movably within each flange in the shape of a spherical cap with its inner, normally convex side composed of a layer of metal and its outer, normally concave side composed of a layer of a different metal of a higher coefficient of thermal expansion, a metal ball retained in the center of the inner layer of each disk by a retainer with the center of said metal ball aligned concentrically with and projecting partially through the port in the side of the tube thereby supporting said absorber, said metal ball being biased inwardly toward said absorber, whereby upon reaching a preset temperature, stresses will be created within at least one of the bimetallic disks; the imbalanced thermal stresses will cause at least one disk to reverse concave and convex sides thus removing the ball from the hole in the wall of the tube allowing the absorber to drop into the reactor core.

2. The combination of claim 1 wherein the outer layer of each bimetallic disk is made of stainless steel, the inner layer is made of molybdenum and the ball is made of cobalt alloy tool material.

3. The combination of claim 1 wherein the outer layer of the bimetallic disk is made of a nickel-chromium-iron alloy, and the inner layer is made of molybdenum-titanium alloy.

4. The assembly of claim 1 including means responsive to reactor power for generating heat disposed in each bimetallic disk whereby said generating means in response to an increase in reactor power will cause at least one disk's temperature to increase to the preset temperature where imbalanced thermal stresses in the disk will cause the disk to reverse conical and convex sides.

5. The heat generation means of claim 4 wherein the means is comprised of a foil of fissionable metal disposed in the bimetallic disk between the two layers thereof.

6. The heat generation means of claim 4 wherein the means is comprised of discrete nodules of an oxide of a fissionable metal dispersed within at least one of the layers of the bimetallic disk.

7. A temperature actuated shutdown assembly for a liquid metal cooled nuclear reactor comprising a hexagonal absorber rod, a hexagonal tube disposed around said absorber rod and coaxial with the longitudinal axis of the absorber rod, said tube having three ports therein located in alternate sides of the hexagonal tube, a round "L" shaped flange welded to the tube side concentrically over each of said ports, a bimetallic disk within each flange shaped as a spherical cap with the normally concave outer side of the disk composed of stainless steel and the normally convex inner side composed of molybdenum, means responsive to reactor power for generation of heat within said bimetallic disk, a helical spring trapped compressively between each flange and each disk and urging said disk toward the tube, a cobalt alloy tool material ball retained in a spherical depression in the center of the inner layer of each said disk by a retainer formed of the material of the inner layer, the bimetallic disks being retained movably against the sides of the hexagonal tube by the circular flanges with the centers of the cobalt alloy tool material balls aligned concentrically with and projecting partially through the ports in the sides of the hexagonal tube supporting a conical bottom of said absorber rod, whereby upon reaching a liquid metal coolant temperature in the range of 550°C. to 770°C., a condition of imbalanced, thermally induced stresses will be created within at least one of the bimetallic disks as a result of the differing thermal coefficients of expansion of the two composite metals; the imbalanced thermal stresses will cause at least one bimetallic disk to reverse concave and convex sides thus removing the ball from the hole in the side of the hexagonal tube allowing the absorber rod to slip towards the removed ball or balls thus clearing the unremoved balls or ball and dropping into the reactor core thus depressing reactor power.

* * * * *